INVENTORS:
JOHN A. HAEBER
WILLIAM F. MILLER
JOSEPH H. HYNES
JAMES W. E. HANES
BY:
THEIR ATTORNEY

INVENTORS:
JOHN A. HAEBER
WILLIAM F. MILLER
JOSEPH H. HYNES
JAMES W. E. HANES
BY: *Kenneth Cocks*
THEIR ATTORNEY Jan. 2, 1968   J. A. HAEBER ET AL   3,361,199
FLOWLINE INSTALLATION APPARATUS
Filed Sept. 30, 1965   6 Sheets-Sheet 3

INVENTORS:
JOHN A. HAEBER
WILLIAM F. MILLER
JOSEPH H. HYNES
JAMES W. E. HANES
BY: *Kenneth H. Cocks*
THEIR ATTORNEY

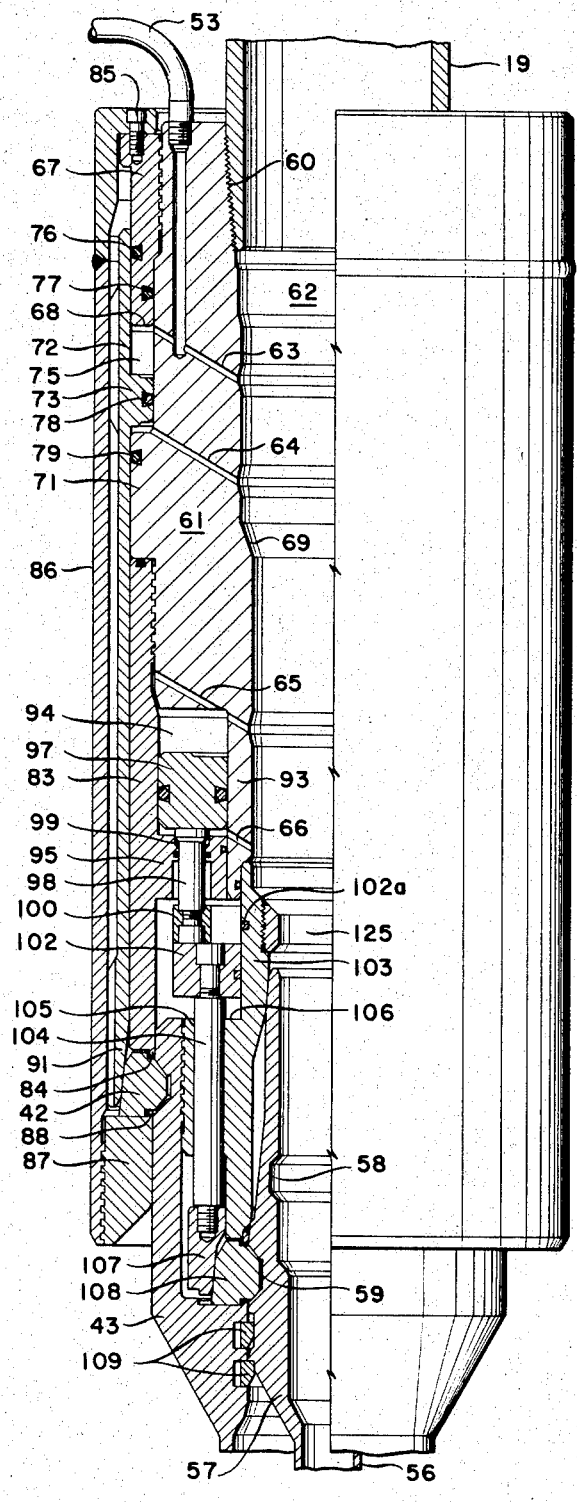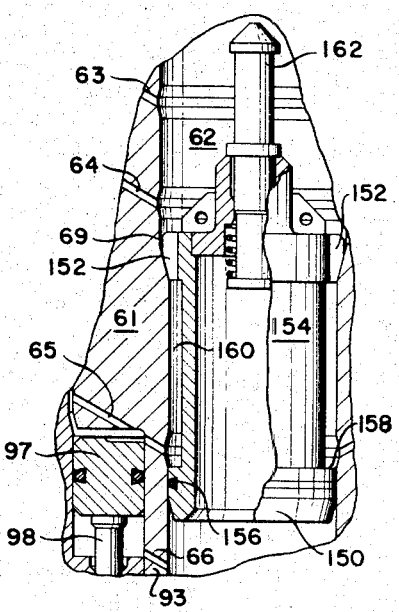

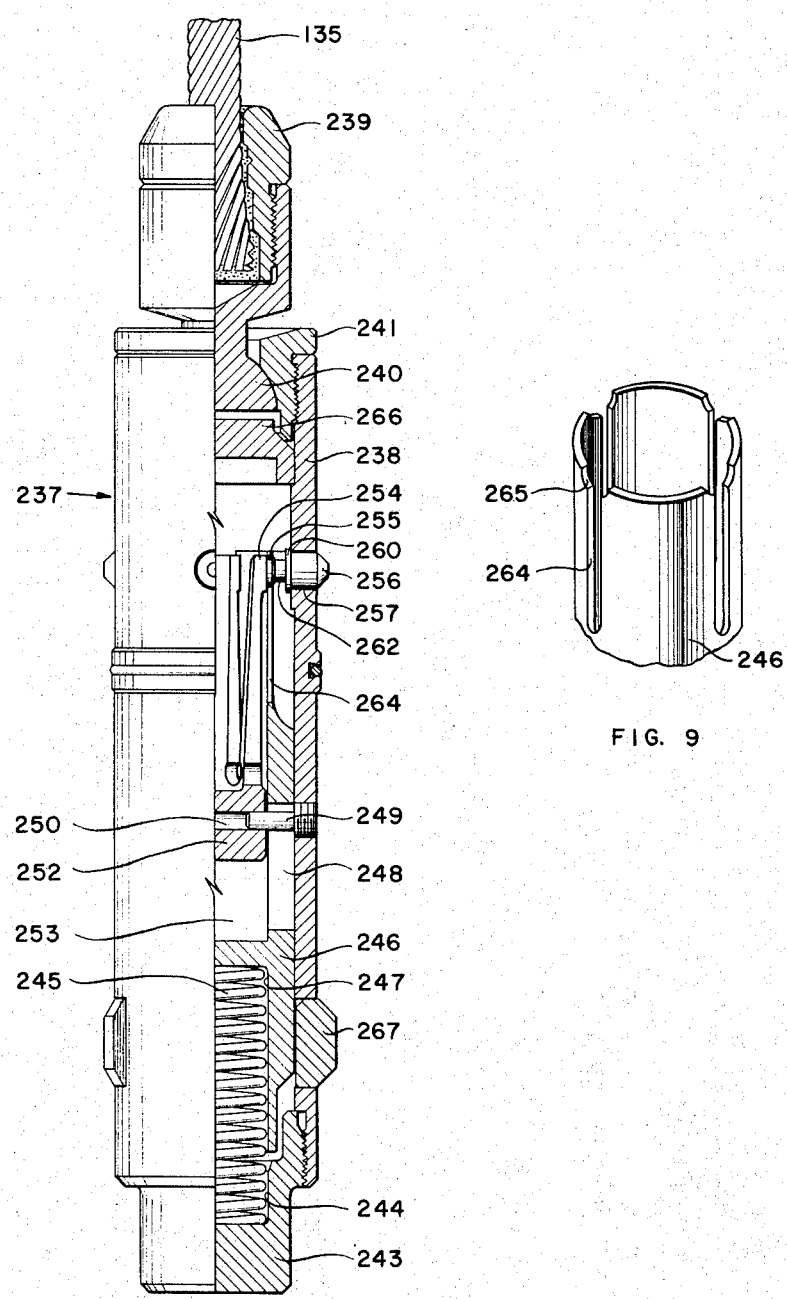

INVENTORS:
JOHN A. HAEBER
WILLIAM F. MILLER
JOSEPH H. HYNES
JAMES W. E. HANES
BY: *Kenneth H Cocks*
THEIR ATTORNEY

United States Patent Office 3,361,199
Patented Jan. 2, 1968

3,361,199
FLOWLINE INSTALLATION APPARATUS
John A. Haeber, William F. Miller, Joseph H. Hynes, and James W. E. Hanes, Ventura, Calif., assignors to Shell Oil Company, New York, N.Y., a corporation of Delaware
Filed Sept. 30, 1965, Ser. No. 491,764
7 Claims. (Cl. 166—.5)

ABSTRACT OF THE DISCLOSURE

An apparatus for remotely installing a flowline in an underwater facility in which an alignment device (for example, a tube having a flared mouth) serves to align a flowline pulled into it by a flexible drawline extending through the alignment device. The drawline is attached to an end of the flowline by means of a releasable housing carried by the flowline so that once the flowline is pulled in place in the alignment device, the drawline and housing are automatically disconnected from the flowline.

---

The present invention relates to oil well equipment for use at underwater locations and pertains more particularly to apparatus for remotely coupling a conduit to an installation submerged within a body of water. The invention is specifically directed toward flowline installation apparatus which is adapted to releasably engage a flowline for positioning the latter in an alignment tube associated with an underwater facility, such as a wellhead or production platform.

For many years offshore wells have been drilled either from stationary platforms anchored to the ocean floor, movable barges temporarily positioned on the ocean floor, or movable barges floating on the body of water in which drilling operations are being conducted. Regardless of the manner in which the wells are drilled, most wells have been completed in a manner such that the outermost tubular member of the well extends upwardly from the ocean floor to a point above the surface of the body of water where a wellhead assembly or Christmas tree is mounted for controlling the production of the well.

Wellheads extending above the surface of a body of water have the disadvantage that they constitute a hazard to navigation in the vicinity of the well. In addition, when such wellheads are positioned in salt water, such as found in the ocean, the structure extending above the water is subject to the corrosive action of salt water and air. Positioning the wellhead and/or casinghead above the surface of the body of water has the advantage, however, that the flow-handling and controlling components of the wellhead may be readily secured thereto and adjusted by an operator working from a platform adjacent to the wellhead structure.

Recently, methods and apparatus have been developed for drilling and completing oil and gas wells in the ocean floor in a manner such that after completion of the well the wellhead assembly is positioned beneath the surface of the ocean, preferably on the floor thereof. In practice, these wellhead assemblies are often positioned in depths of water greater than the depth at which a diver can safely and readily work. Thus, the coupling of flow conduits to such wellhead assemblies presents a new and difficult operation which is not readily carried out by presently available well-working equipment.

The problem of securing flowlines to installations submerged in very deep bodies of water is particularly acute because of the high ambient pressures involved and the difficulty of handling long lengths of pipe remotely. This problem is accompanied by the natural problems that are encountered when lowering flowlines to the bottom of relatively deep bodies of water. The high ambient pressure generally makes the use of flexible connection facilitating conduits impractical, since such conduits are very expensive and relatively rigid when fabricated to withstand the high pressures encountered. The use of flexible conduits is also often obectionable, since such conduits do not generally facilitate the passage of pumpable through-the-flowline tools therethrough. The latter characteristic is particularly detrimental, since pumpable through-the-flowline tools provide one of the most practical solutions to the workover problems encountered in submerged wells. Long lengths of pipe are difficult to handle when submerged deeply in a body of water both because of the mass of pipe involved and the remoteness of the handling operation. It is noted that it is particularly difficult to lower long lengths of pipe directly into communication with a deeply submerged underwater installation because of the exact length of pipe required to reach the installation is impossible, as a practical matter, to determine.

It is, accordingly, a principal obect of this invention to provide apparatus for remotely connecting a flowline to an installation submerged in a deep body of water while overcoming the aforediscussed difficulties. The objects of the invention are accomplished by providing the installation with a special alignment means, such as a tube, and extending a drawline or cable through this alignment means. The provision of the alignment means and the extending of the drawline therethrough may be accomplished either before or after the installation is submerged.

In a preferred embodiment, after the installation is provided with the alignment tube, one end of the drawline extending therethrough is secured to the flowline, by means of the installation apparatus of the present invention, and tension is applied to the other end of the drawline. The flowline is thereby drawn into the alignment tube and thereafter the installation apparatus is automatically released from inside the flowline for recovery at the surface. In the case where the flowline is fabricated from a relatively rigid steel, the flowline may be plastically deformed as it is pulled through the alignment tube. Upon being pulled through the alignment tube, the flowline is secured concentrically in the upper end thereof. With the flowline head thus accurately positioned in a predetermined vertical position at the underwater installation the actual fluid communication between the installation and the flowline may be established in any suitable manner, such as by the use of jumper tubes as shown in the U.S. Patent to Dozier and Johnson, No. 3,298,092, issued Jan. 17, 1967.

In a broad aspect, the apparatus of the present invention may be defined as a system to facilitate the remote joining of a flowline to an installation submerged in a body of water from a station located on the surface thereof. The apparatus comprises at least one guide element fixed to the installation and a guide line extending between the element and the station located on the surface of the body of water. Included as an essential element of the apparatus is an alignment means for receiving and accurately aligning the flowline. A guide line receiving means, such as a tubular sleeve, is operatively associated with the alignment means and adapted to slide along the guide line and into engagement with the guide element. The alignment means is also provided with a mechanism to secure it to the installation and with a flexible drawline extending therethrough to pull a flowline thereto. To complete the basic apparatus, the flexible drawline is provided on one end with a specially constructed installation tool adapted to engage the flowline head and to disengage therefrom after the flowline has been pulled to the proper position at the alignment means.

The invention and the specifics thereof will be more fully understood from the following detailed description when taken in conjunction with the accompanying drawings, wherein:

FIGURE 5 is a vertical section illustrating a preferred form of dart for actuating a flowline locking mechanism formed in the upper end of the alignment tube of FIGURE 1;

FIGURE 6 is a detailed side elevation, partially in section, illustrating a flowline accurately positioned and locked inside the upper end of the alignment tube of FIGURE 1;

FIGURE 8 is an enlarged side elevation, partially in section, of the flowline installation tool;

FIGURE 9 is an enlarged perspective view of the upper portion of the internal sleeve used in the installation tool of FIGURE 8.

Figure 1:
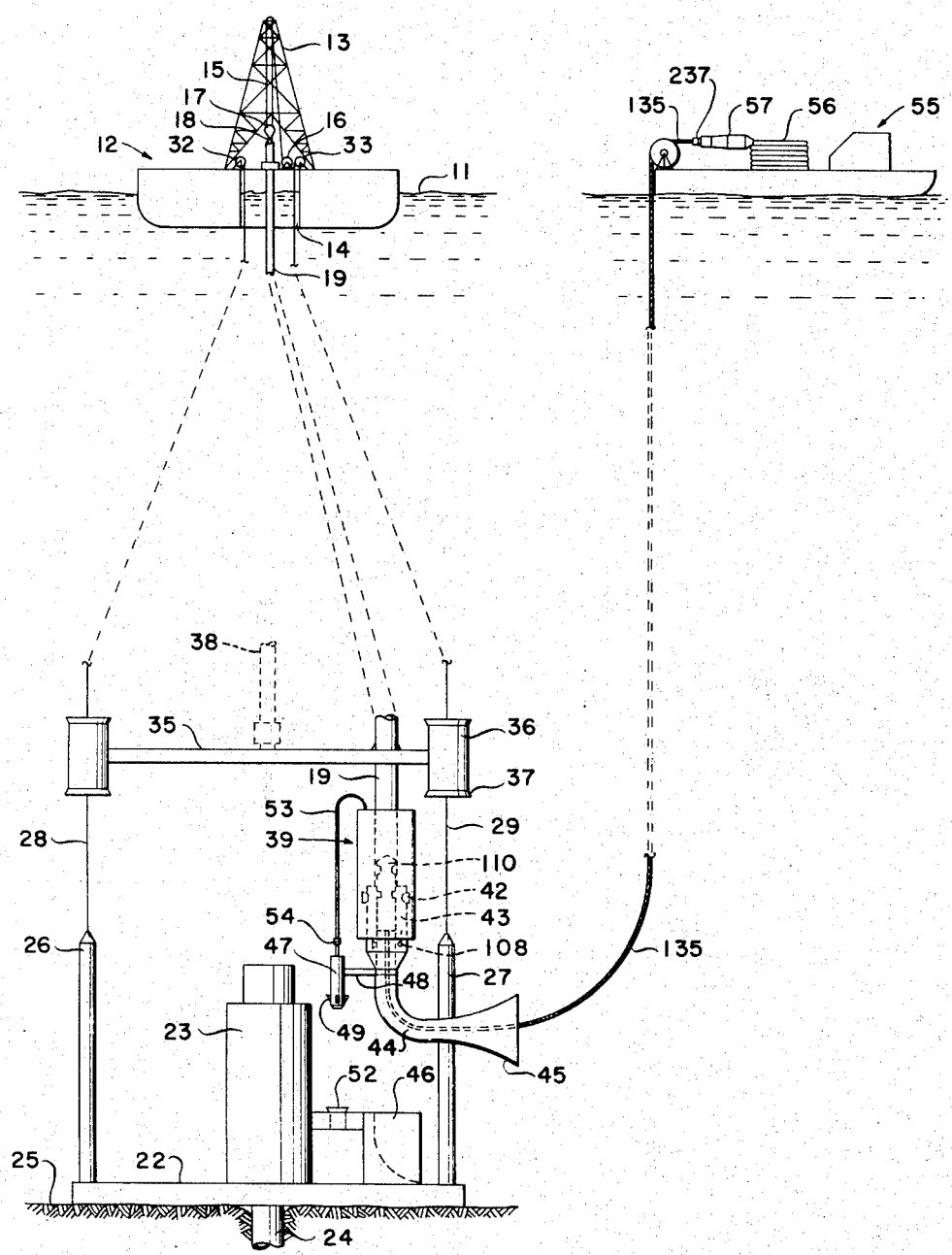
FIGURE 1 is a diagrammatic view illustrating an underwater installation with the alignment tube of the present invention in the process of being installed thereon.

Referring to FIGURE 1 of the drawing, there is illustrated an exemplary application of the invention in use in a body of water 11. In order to facilitate the application of the invention, an operating station taking the form of a barge 12 is illustrated as floating on the surface of the water 11 in a position approximately above a preselected underwater installation. The barge 12 may be of known construction and includes a suitable derrick 13 having a well 14 thereunder communicating with the body of water 11. The derrick 13 is equipped with fall lines 15 and a hoist 16 for operating a traveling block 17 to which are secured elevators 18 or other suitable means for suspending a running string 19 during underwater completion or workover operations.

A wellhead support structure, which is represented by a horizontally extending support base 22, having a wellhead or production platform assembly 23 secured thereto and centrally positioned thereon, is illustrated as being anchored to the ocean floor by means of a conductor pipe or surface casing 24 which is installed and preferably cemented in the ocean floor 25. Secured to the support base 22 are two or more guide columns 26 and 27 having guide cables 28 and 29 extending vertically therefrom to the floating barge 12 where they are preferably secured to the barge by means of constant-tension winches 32 and 33. The guide cables 28 and 29 are provided for the purpose of guiding pieces of equipment from the barge 12 into alignment onto or adjacent to the wellhead 23 positioned on the ocean floor 25.

In the lower portion of FIGURE 1, the running string 19 is shown fixedly secured to a guide frame 35 which is provided with guide tubes 36 which slide upon the guide cables 28 and 29. Preferably, each of the guide tubes 36 has a cone-shaped downwardly flared flange 37 attached or integrally formed on its lower end which serves to accurately align the guide tubes 36 as they move downwardly onto the guide posts 26 and 27. If desirable, the guide frame 35 may be provided with an auxiliary running string 38 to lend stability and added control during the lowering operation. Attached to the lowermost end of the running string 19 is a running string latching tool 39 having latching dogs 42 adapted to engage the enlarged head 43 of a curved horn or alignment tube 44, which horn is being lowered into position adjacent the wellhead 23 for receiving and accurately positioning an underwater flowline with respect to said wellhead. The tube 44 is also preferably provided with a flared mouth portion 45.

A horn-receiving block 46 is attached to the wellhead 23 and supported by the support base 22. In order to securely lock the horn 44 to the block 46 there is provided a locking plunger 47 attached to the horn 44 by an arm 48 and having dogs 49 operable to hold the locking member 47, and consequently the horn 44, against upward movement once the member 47 has passed through a cylindrical opening 52 formed in the receiving block 46. As will be readily understood by those skilled in the art, the dogs 49 on locking plunger 47 are normally spring biased outwardly but may be moved inwardly by hydraulic pressure applied through the tubing line 53 which is provided with a conventional breakaway coupling 54.

FIGURE 1 additionally shows a flowline lay barge 55 provided with a supply of flowline 56 which is to be drawn into the curved horn 44 and accurately aligned and locked within the horn head 43 after the horn has been lowered and locked in position on the receiving block 46.

The operation of lowering the curved horn or alignment tube 44 onto the receiving block 46 located on the underwater wellhead or production facility 23, whereby a section of flowline may subsequently be drawn off the lay barge 55 and pulled inside said curved horn 44, commences on the surface of the body of water 11 with the attachment, by welding or other suitable coupling means, of the running string 19 to the guide frame 35. At this time, the running string latching tool 39 is secured to the lowermost end of the running string 19 by any suitable means such as by a threadable means 60 (see FIGURE 6).

As best shown in FIGURE 6, the running string latching tool 39 comprises a main body member 61 which is provided with a hollow bore 62 which runs lengthwise through the center of body members 61 and is in communication with the interior of the tubular running string 19. The main body member 61 is provided with a series of ports 63, 64, 65 and 66 extending transversely therethrough, preferably inclined to the tool axis, and communicating with the central bore 62. An internally protruding circumferential landing surface 69 is formed in the hollow bore 62, between the ports 64 and 65, and is adapted to receive various darts or plugs for selectively channeling fluid pressure to the various ports 63–66 as will be described, infra.

An annular stop ring 67 is threadably or otherwise secured on the outer surface of the upper end of the main body member 61. The lowermost end of the stop ring 67 terminates in a flat seat 68 at a location just above the external orifice of port 63. Just below the external orifice of port 64 the body member 61 is provided with an external shoulder 71 having an outer diameter equal to the outer diameter of the stop ring 67. A hollow cylindrical sleeve 72 is positioned about stop ring 67 and the external surface of the shoulder 71 for sliding engagement therewith. An internal piston means is formed at 73 by providing the sleeve 72 with an inwardly projecting annular flange. Thus, the sleeve 72 is free to slide in the space 75 defined by the flat seat 68 of the stop ring 67 and the upper surface of the shoulder 71. O-ring sealing members 76, 77, 78 and 79 are provided to insure that the system is fluidtight.

Threadably attached to the lower end of the main body member 61 of the running string latching tool 39 is a housing member 83 whose lowermost end is provided with a stop shoulder 84 to limit the radial inward travel of the aforementioned latching dogs 42. Referring back to the upper stop ring 67, there is shown connected to the upper end thereof, as by means of a threaded fastener 85, an outer casing member 86 which is provided at its lower end with an inwardly protruding support ring 87 which supports the latching dogs 42 for transverse sliding movement.

As shown, the support ring 87 is provided with a stop shoulder 88 similar to stop shoulder 84 to limit the inward travel of the latching dogs 42. The lower end of the slidable sleeve 72 is slightly flared to provide a chamfered actuating surface 91 which is adapted to cooperate with mating chamfered outer surfaces on the dogs 42 so that downward movement of the sleeve 72 forces the dogs 42 to move radially inwardly to lock an element such as the horn head 43, securely inside the running string latching tool 39. By selectively applying fluid pressure through port 63 to the upper surface of internal piston means 73 formed on the slidable sleeve 72, the latter will move downwardly and the chamfered actuating surface 91 formed on the lower end thereof will cam the latching dogs 42 into locking engagement with the horn head 43. Conversely, by selectively channeling fluid through port 64 to the lower surface of piston means 73, the sleeve will move upwardly, allowing the latching dogs 42 to disengage the horn head 43.

The lower end of the main body member 61 of the running string latching tool 39 comprises a reduced outer diameter portion 93 which cooperates with the housing member 83 to form an annular space 94. An inwardly protruding annular shoulder 95 is formed on the housing 83 in such a manner that it sealingly abuts the outer side of the reduced diameter portion 93 at its lower end to close off the lower end of the cylindrical space 94. A ring-shaped piston member 97 is provided in the space 94 in such a manner that it may slide vertically. A plurality of downwardly extending piston rods 98 are provided at various locations about the circumference of the ring-shaped piston 97. The piston rods 98 extend slidingly through sealed bores 99 formed in the shoulder 95. A second ring-shaped abutment element 100 is suitably attached to the lower end of the piston rods 98. Thus, it will be understood, that when fluid pressure is selectively applied to the upper surface of piston 97 through the port 65, the piston 97 and ring 100 will move downwardly. Conversely, when fluid pressure is selectively applied to the lower surface of the piston 97 via the port 66, the piston 97 will slide to its uppermost position. When the element 100 is in raised position it is received within an annular recess in the shoulder 95, into which the bores 99 debouch.

Still referring to FIGURE 6, it is noted that the horn head 43 is also provided with a second ring 102 positioned about a sleeve 103 threadably secured to the horn head and having a reduced diameter. The ring 102 is adapted for vertical sliding movement with respect thereto. The ring 102 is initially positioned in raised position (see FIGURE 4), and held in place by a shear pin 102a (shown in FIGURE 6 after it has been severed) so that downward movement by the ring 100 will shear the pin 102a and force the ring 102 to move downwardly. A plurality of downwardly extending connecting rods 104 are provided at spaced locations about the circumference of the ring 102. The connecting rods 104 extend through bores 105 formed in an outwardly protruding annular shoulder 106 formed below the reduced diameter portion 103 of the horn head 43, thus permitting the rods 104 to slide vertically within the bores 105. A camming element 107, which may be a ring or fingers, is provided on the lower end of each of the piston rods 104 for camming a plurality of latching dogs 108 in the radial inward direction to firmly lock an element, such as a flowline head 57 having a dog-receiving recess or groove 59, inside the horn head 43 upon downward movement of the rods 104. The horn head 43 is also provided with one or two rows of resiliently expandable annular split-ring retaining elements 109 which are adapted to cooperate with the outer surface of the flowline head 57 by closing resiliently inwards into external grooves formed in said head, to insure that once the latter has been pulled a certain distance into the horn head 43 it cannot thereafter move in the downward direction.

Figure 2:
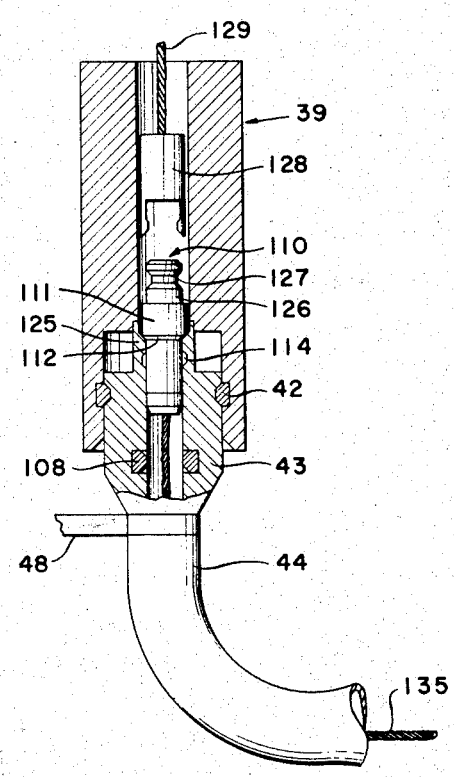
FIGURE 2 is a simplified side elevation, partly in section, illustrating a drawline pulling tool positioned inside the upper end of the alignment tube.
Figure 3:
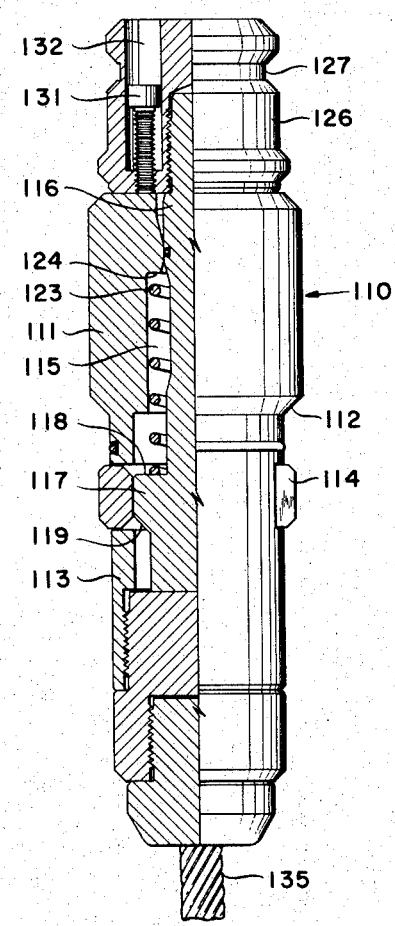
FIGURE 3 is a detailed elevation, partially in longitudinal section, of a preferred form of the drawline pulling tool.

Referring to FIGURE 3 in conjunction with FIGURES 1 and 2, there is shown a wire line or drawline pulling tool 110 having an outer diameter sufficiently small to allow passage of the tool 110 through the running string 19. The wire line pulling tool 110 comprises a main housing 111 which is provided with an external circumferential seating shoulder 112. Below the seating shoulder 112, the housing 111 comprises a reduced diameter portion 113 having a plurality of radial slots formed therein. These radial slots are adapted to slidably receive segmental locking dogs 114. The housing 111 defines an internal cavity 115 which has an opening at the top thereof for slidably receiving a rod member 116. An external shoulder 117 is formed on the lower end of the rod member 116 and is provided with an upper flat seat 118 and a downwardly and inwardly beveled camming surface 119 formed on its lower side. A coil spring 123 is seated on an annular land 124 within the housing 111 and is biased against the flat seat 118 of the shoulder 117 to normally force the rod member 116 downwardly and thereby force the segmental dogs 114 outwardly into locking positions against the horn head 43.

As best shown in FIGURE 2, the seating shoulder 112 formed on the wire line pulling tool 110 is adapted to engage an annular inwardly directed landing surface 125 formed in the horn head 43. The wire line pulling tool 110 is constructed to mate with the landing surface 125 of horn head 43 in a manner such that when the seating shoulder 112 of the pulling tool 110 engages the landing surface 125, and when the dogs 114 are biased into their outer locking position, the tool 110 is firmly locked within the head.

The upper end of rod member 116 comprises an enlarged head 126 which is provided with a circumferential locking groove 127 which is adapted for locking engagement with the jaws of a conventional wire line fishing tool such as shown at 128 in FIGURE 2. Thus, as will be readily understood, when the jaws of the fishing tool 128 lock within the groove 127 of the enlarged fishing head 126, the application of a pulling force through a wire line such as shown at 129 will overcome the resistance of the coil spring 123 whereby the shoulder 117 of the rod member 116 will move upwardly allowing locking dogs 114 to be cammed radially inwardly so that the entire tool 110 may freely pass upwardly beyond the shoulder 125 of horn head 43.

As shown in FIGURE 3, a set screw 131 is threadably received in the lower portion of a countersunk bore 132 extending longitudinally through the enlarged fishing head 126 at an off-centered peripheral location thereof. The set screw 131 may be threaded through the lower end of the bore 132 to drive the enlarged fishing head 126 and consequently the rod member 116 upwardly thereby overcoming the spring force exerted by coil spring 123 and allowing the locking dogs 114 to move radially inwardly. As will be more fully understood infra, the set screw 131 provides an easily operable mechanical means for "cocking" the tool in its non-locking position such that it may be inserted within the horn head 43, after which the set screw may be unscrewed to allow the rod member 116 to move downwardly under the force of the coil spring 123 thereby forcing the locking dogs 114 radially outwardly so that the tool 110 is firmly locked about the landing shoulder 125 of the horn head 43.

As best shown in FIGURE 1, the lead end of a wire line or drawline cable 135 is suitably attached to the "bottom" end of the drawline pulling tool 110. In FIGURES 1 and 2, the wire line pulling tool 110 is shown positioned in the horn head 43 and the wire line 135 which is connected thereto, has been passed through the curved horn 44 and extends upwardly through the water 11 to the flowline lay barge 55. At the lay barge 55 the trailing end of the drawline 135 is connected to a specially constructed flowline installation tool 237 which is adapted to releasably lock inside a lead section of flowline 56 positioned on the barge 55, which lead section of flowline 56 is provided with the specially constructed flowline head 57.

Figure 4:
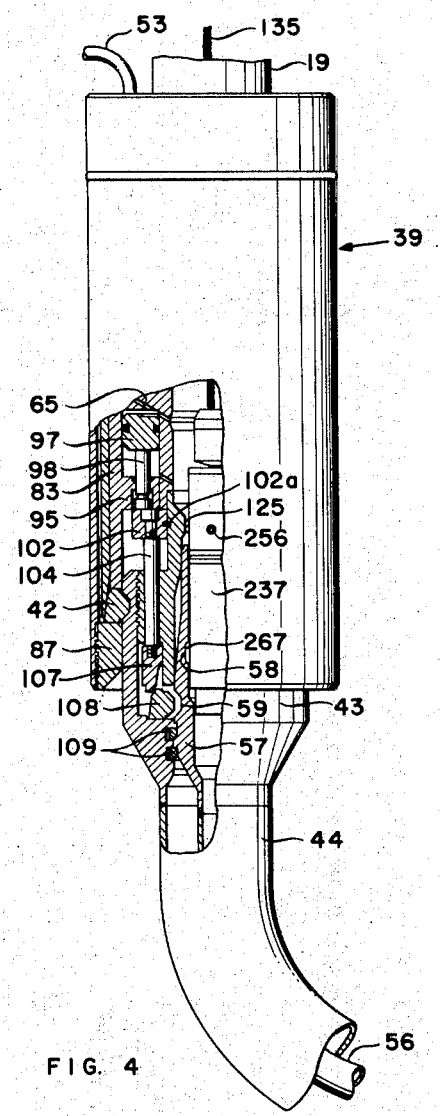
FIGURE 4 is a simplified side elevation, partially in section, illustrating a flowline installation tool after a flowline has been pulled inside the alignment tube of FIGURE 1.

Referring now to FIGURE 4, the flowline pulling tool 237 is shown locked inside the flowline head 57 after a pulling force has been applied through the cable 135 to pull the tool 237 and a long length of flowline sections 56 from the lay barge 55 down to the ocean floor and up through the curved horn 44 to the horn head 43. At this point it should be noted that the horn or alignment tube 44 is provided with an enlarged, flared mouth 45 to facilitate an easy entry of the tool 237 and flowline head 57 into the tube.

The specific details of the flowline installation tool 237 will now be described with reference to FIGURES 8 and 9. In FIGURE 8, the flowline installation tool 237 is shown enlarged and in the same position as that depicted in FIGURE 4. The tool 237 has a tubular main body member or housing 238 of external diameter closely approaching the internal diameter of the flowline head 57, but sufficiently smaller than said internal diameter to slide into the end.

A threadedly separable, two-part drawline socket member 239 is provided on the upper end of the housing 238 having the drawline or cable 135 fixedly secured therein. The lower end of the socket member 239 is provided with a hemispherical enlargement 240 which is retained for limited universal pivotal movement by a retaining sleeve 241 threadably received on the upper end of the housing 238.

The lower end of the housing 238 threadably receives a plug 243 which has a cylindrical internal cavity 244 for receiving and seating a compressed coil spring 245. A slidable sleeve 246 is positioned within the housing 238 and is provided on its lower end with an internal seating compartment 247 for the upper portion of the coil spring 245. The major portion of the sleeve 246 has an external diameter slightly smaller than the internal diameter of the housing 238 so that the sleeve is free to slide longitudinally within the housing.

As shown in FIGURE 8, the mid-portion of the sleeve 246 is provided with a first plurality of circumferentially spaced slots 248. The slots 248 are adapted to receive a plurality (preferably three or four) of radial alignment pins 249 which are threadably engaged in the housing 238. The alignment pins 249 penetrate through the slots 248 and extend into a plurality of radial bores 250 formed at circumferentially spaced locations in the lower end of a spring-fingered collet 252 which is secured inside a second internal compartment 253 of the sleeve 246. As will be readily understood, the slots 248 permit the sleeve 246 to slide longitudinally while the collet 252 is secured against either longitudinal or rotational movement with respect to the housing 238.

The collet 252 is provided with a plurality (preferably four) of spring fingers 254 which urge the enlarged, disc-like rear faces 255 of a plurality of actuating buttons 256 in the radial outward direction. The buttons 256 penetrate outwardly, through housing bores 257, beyond the exterior of the housing 238. An annular stop shoulder 260 is formed on the buttons 256 in order to limit the extent of their outward travel. Immediately behind the said shoulder 260, and between the shoulder and the disc-like faces 255, each of the buttons is provided with a reduced diameter neck 262.

Reverting to the sleeve member 246 and with reference to FIGURES 8 and 9, it should be noted that the extreme upper end of the sleeve is provided with a second plurality of vertical slots 264 which terminate in open-ended notches 265. The notches 265 (see FIGURE 9) are preferably semi-circular in shape for matingly receiving the said disc-like rear faces 255 of the buttons 256 when the latter are in their normal outwardly biased position under the action of the spring fingers 254. The slots 264 are slightly larger than the neck portions 262. Thus, when an external force is applied to the outer noses of all of the buttons 256, the buttons will move radially inward, overcoming the outward bias of the spring fingers 254 and freeing the disc-like rear faces 255 from engagement with the notches 265. At this point the compressed coil spring 245 is freed to move the entire sleeve 246 upwardly; the slots 264 now being free to slide about the reduced diameter neck portions 262 of the buttons 256. Upward movement of the sleeve 246 continues until the sleeve comes into contact with a seating block 266 which is held in place in the upper end of housing 238 by the retaining sleeve 241.

Referring now to FIGURES 4 and 8, the inner surface of the flowline head 57 is provided with an annular groove 58 which is adapted to receive a plurality of locking dogs 267 circumferentially spaced about the lower end of the flowline installation tool 237 and slidable in individual slots of the housing 238. The locking dogs 267 of the flowline installation tool 237 are normally forced outwardly by the slidable sleeve 246 (FIGURE 8) to insure that the tool 237 remains securely locked inside the flowline head 57. As shown in FIGURE 4, the buttons 256 are located outside the upper end of the flowline head 57 when the tool 237 is locked therein via the dogs 267. The buttons 256 are positioned on the upper end of the tool 237 in a manner such that they will be forced radially inwardly when the tool 237 is pulled upwardly, via drawline 135, into contact with the anular shoulder 125 located on the inner surface of the horn head 43. As described supra, the buttons 256 are interconnected with the locking dogs 267 by the sleeve mechanism 246 located inside the body of the tool 237 such that when the buttons 256 are moved inwardly by contact with the shoulder 125, the dogs 267 are also free to move radially inwardly. Thus, the tool 237 becomes unlatched from the inside of the flowline head 57 and is free to move upwardly through the running string 19 to the barge 12 where it may be recovered.

As also shown in FIGURE 4, the latching dogs 108 on the horn head 43 are not engaged with the external circumferential groove 59 of the flowline head 57 when the flowline pulling tool 237 is released from inside the flowline head 57 and recovered at the surface. However, the expandable split-ring retaining elements 109 at the lower end of the horn head 43 have at that time engaged with the specially constructed lower end of the flowline head 57 and prevent the latter from moving downwardly out of the horn head 43.

One of the most important functions of the horn head latching dogs 108 is to effect a final accurate alignment of the flowline head 57 within the horn head 43. This highly critical alignment function is necessary to ultimately insure a proper connection between the flowline head 57 and the jumper tubes (not shown) used to connect the flow line 56 with the wellhead 23. As best shown in FIGURE 6, the latching dogs 108 have specially constructed camming noses which cooperate with the external groove 59 of the flowline head 57 so that as the dogs 108 are forced inwardly the flowline head 57 is moved upwardly into a final, accurately aligned position within the horn head 43.

In order to actuate the horn head latching dogs 108 a dart 150, shown in FIGURE 5, is dropped or pumped down the runing string 19 until a plurality (preferably four) of outwardly projecting shoulders 142, formed at circumferentially spaced locations on the upper end of the dart, seat on the landing surface 69 of the bore 62. As shown in FIGURE 5, the dart 150 comprises a hollow, open-bottomed, generally cylindrical main body member 154 which is provided with an external circumferential O-ring seal 156, formed on a shoulder 158 on its lower end, for sealingly engaging the inner wall of the bore 62 at a location between the ports 65 and 66. After the shoulders 152 of the dart 150 seat on the landing shoulder 69, fluid pressure in the running strong 19 is transmitted downwardly through an annular space 160 between the bore 62 and dart 150, and through the port 65 to the top of the piston ring 97. As the piston 97 begins to move downwardly under the said fluid pressure, the fluid below the piston is exhausted into the bore 62 via the port 66.

Downward movement of the piston 97 forces the ring 100 into engagement with the ring 102, initially positioned in its upper position on the horn head 43. Continued application of fluid pressure causes the shear pin 102a to break, whereby the camming fingers 107 move downwardly from the position shown in FIGURE 4 to cam the horn head latching dogs 108 into engagement with groove 59 of the flowline head 57. This latter movement serves to drive the flowline head 57 upwardly into a very accurately aligned position inside the reduced diameter portion 103 of the horn head 43. The dart 150 may now be retrieved upwardly through the running string 19 by lowering a wire line fishing tool, similar to the tool shown at 128 in FIGURE 2, which will latch onto the fishing head 162 formed on the upper end of the dart 150.

After the flowline head 57 has been installed in an accurately centered and aligned position within the horn head 43, the entire running string assembly, including the running string 19 and the running string latching tool 39, may be retrieved. This retrieval operation is carried out by dropping or pumping the dart 170, shown in FIGURE 7, down the running string 19 until the annular external shoulder 172 formed on the lowermost end of the dart seats on the landing surface 69 of the bore 62. The shoulder 172 is provided with an external circumferential O-ring 173 for sealingly engaging the inner wall of the bore 62 to prevent fluid flow downwardly past the shoulder 172.

The dart 170 comprises a hollow, open-bottomed cylindrical main body member 174, having two additional external O-rings 176 and 178 positioned so as to seal off or isolate the port 63 from communication with fluid in the bore 62. An annular space 179 is defined between the O-rings 176 and 178 so as to be in communication with the port 63 when the dart 170 is seated on the landing surface 69. A horizontal bore 181 (shown in dotted lines) permits fluid communication between the space 179 and the hollow interior of the dart body 174. A longitudinal bore 180 extends downwardly from the upper surface of the dart 170 (in a different circumferential position from the horizontal bore 181) and communicates with an annular space 182 defined by the O-rings 173 and 176. The space 182 is formed on the dart 170 in a manner such that when the dart is seated on the landing surface 69, the space 182 communicates with the port 64 formed in the body member 61 of the running string latching tool 39.

Thus, continued application of fluid pressure through the running string 19 will force fluid down the dart bore 180 and out through the port 64 to force the internal piston 73 upwardly. As the piston 73 moves upwardly, fluid in the space 75 is exhausted through the port 63, the space 179 and the dart bore 181. As best shown in FIGURE 6, upward movement of the piston 73 causes the camming surface 91 on the lower end of the sleeve 72 to disengage the running string latching dogs 42. The dogs 42 are now free to move radially outwardly out of engagement with the horn head 43 upon the application of a pulling force to the running string 19. The dart 170 may either be retrieved by a wire line fishing tool, such as shown in FIGURE 2 at 128, or allowed to remain in position for recovery when the entire running string latching tool 39 is pulled to the surface as will be described infra.

Figure 10:
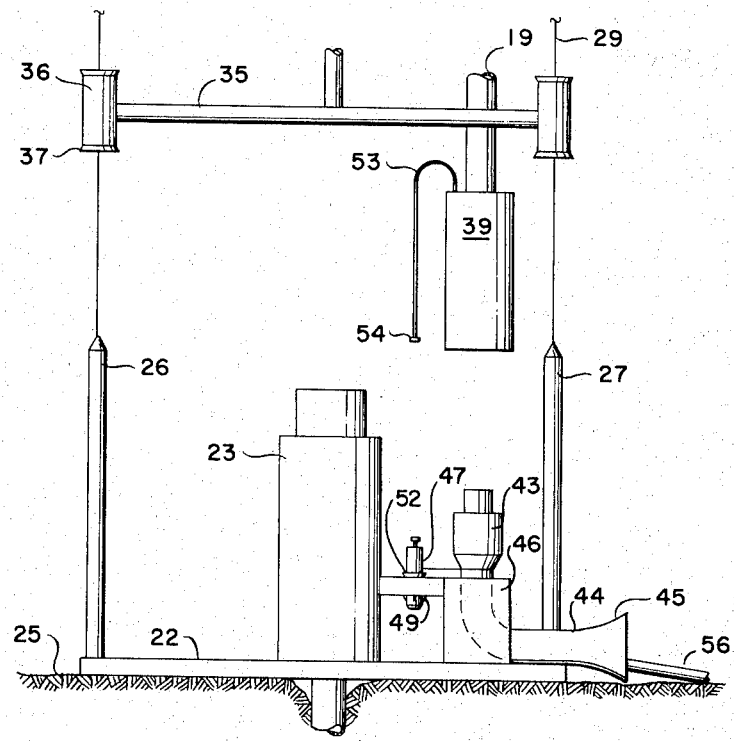
FIGURE 10 is a schematic view illustrating the underwater installation of FIGURE 1 after the flowline has been accurately positioned in a predetermined adjacent position with respect thereto.

Referring now to FIGURE 10, the apparatus is shown just after the application of an upward pulling force from the barge 12 has been transmitted through the running string 19 and guide frame 35 to cause the running string latching tool 39 to move upwardly out of engagement with the horn head 43. The dogs 49 on locking plunger 47 insure that the horn or alignment tube 44 resists any tendency to move upwardly with the running string apparatus. As shown, the horn 44, having the flowline 56 securely and accurately aligned therein, remains securely seated in the receiving block 46. It should also be noted that the breakaway coupling 54, on the actuating line 53 has become disengaged from the locking member 47 due to the upward pull transmitted through the running string 19. Thus, the entire running string apparatus including the guide frame 35, etc., may be pulled to the water surface and recovered at the barge 12.

Operation

The overall operation of lowering both a flowline and flowline receiving apparatus to the ocean floor and accurately aligning the flowline head in a predetermined vertical position at an underwater installation will now be described.

Initially, the guide frame 35 is located above the surface of the water at the vessel 12, and the running string 19 is rigidly secured thereto in such a manner that a portion of the running string extends downwardly through the frame 35 for receiving the running string latching tool 39. The running string latching tool 39 is then attached to the last-mentioned portion of the running string 19 as by the threaded connection 60, best shown in FIGURE 6.

Referring to FIGURES 1, 2 and 3, the operation continues with the threading of the cable 135 through curved horn 44. Thereafter, the cable or drawline pulling tool 110 is attached to the leading end of the drawline or cable 135 in any suitable manner. The drawline pulling tool 110 is then "cocked" by operating the set screw 131 so that the segmental locking dogs 114 may move to their innermost position. The drawline pulling tool 110 is inserted into the horn head 43 and the set screw 131 is then unscrewed to allow the rod member 116 to move downwardly and thereby force the locking dogs 114 radially outwardly to lock the tool 110 about the internal shoulder 125 formed in the upper end of the horn head 43 (see FIGURE 2).

The curved horn or alignment tube 44 is then attached to the lower end of the running string latching tool 39 in the following manner. With the running string latching dogs 42 in a retracted position the horn head 43 is inserted into the lower end of the tool 39 until it properly seats therein. A dart or plug member (not shown) is then inserted through the upper end of the running string latching tool 39 to seal off the bore 62 at a point just below the port 63. Fluid pressure is then applied down through the running string 19 and is transmitted through the port 63 to move the sleeve 72 downwardly and thereby force the latching dogs 42 inwardly to securely lock the horn head 43 inside the running string latching tool 39 (see FIGURE 6). This phase of the operation is completed with the recovery of the aforementioned dart or plug from the running string latching tool bore 62.

The long cable or drawline 135, protruding from the flared mouth 45 of the horn 44 is then run from the barge 12 over to the flowline lay barge 55. At the lay barge 55 the flowline installation tool 237 is attached to the terminal end of the cable 135 and the tool 237 is inserted inside the specially constructed flowline head 57 (see FIGURE 1).

The guide frame 35 having the running string apparatus and the horn or alignment tube 44 attached thereto is then lowered from the barge 12 down towards the underwater installation 23, as shown in FIGURE 1. As the guide frame 35 approaches the underwater installation 23 the guide cones 36 cooperate with the guide posts 26 and 27 to insure proper alignment of the horn or alignment tube 44 with respect to the seating block 46. The horn 44 then seats in the seating block 46 and is securely locked thereto by means of the dogs 49 carried by the locking plunger 47.

The procedure of pulling flowline from the lay barge 55 and into the submerged horn 44 is initiated by pumping or otherwise lowering a wire line fishing tool 128 down through the running string 19 into locking engagement with the fishing head 126 formed on the top end of the drawline pulling tool 110. The application of a pulling force to the wire line 129 raises the member 116, which allows the dogs 114 to move radially inwardly and thereby frees the drawline pulling tool 110 for upward movement through the running string 19. As the drawline pulling tool 110 moves up through the running string 19, pulling the drawline 135 therewith, the flowline installation tool 237 (locked inside the flowline head 57) pulls the flowline 56 off of the barge 55 and down towards the underwater installation 23.

The flowline installation tool 237 and the flowline head 57 locked thereto enter the flared mouth 45 of the horn 44 and are pulled upwardly into the horn head 43 to the vertical position shown in FIGURE 4. It should be noted that the section of the flowline 56 immediately behind the flowline head 57 is plastically deformed to follow the curvature of the horn 44 as it moves through the horn from a horizontal to a vertical position. As the flowline head 57 enters the horn head 43 the expandable split-ring retaining elements 109 expand and again contract to grip the flowline head and prevent the latter from moving downward. Shortly thereafter, the buttons 256 on the flowline installation tool 237 are forced inwardly by the annular shoulder 125 formed internally at the upper end of the horn head 43. The inward movement of the buttons 256 frees the dogs 267 for inward movement, thus allowing the flowline installation tool 237 to move out of the flowline head 57 and be pulled up through the running string 19 to the barge 12.

The next step in the operation involves finally aligning and securely locking the flowline head 57 inside the horn head 43 by forcing the dogs 108 radially inwardly from the position shown in FIGURE 4 to the position shown in FIGURE 6. This phase of the operation involves dropping or pumping the dart 150 down the running string 19 to the position shown in FIGURE 5. Fluid pressure is then applied through the running string 19 and this is transmitted through the port 65 to the piston 97, forcing it downwardly until the pressure applied on ring 102 causes the shear pin 102a to fracture. This forces the camming ring or fingers 107 downward and forces the dogs 108 into locking engagement with the flowline head 57. The dart 150 is then fished from the running string 19 and recovered at the barge 12. The flowline head 57 is now accurately aligned in a predetermined vertical position with respect to the underwater installation 23.

Figure 7:
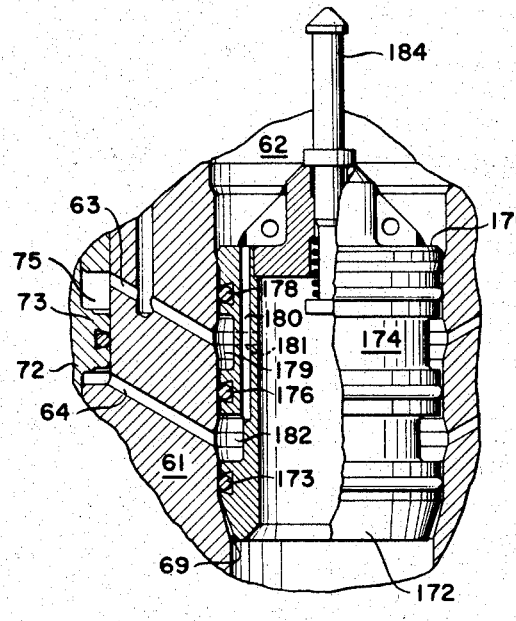
FIGURE 7 is a vertical section of a preferred form of dart used to disengage the mechanism used to lower the alignment tube down to the underwater installation of FIGURE 1.

The final operation of recovering the guide frame and attendant running string apparatus begins with the pumping of the dart 170 down the running string 19 to the location shown in FIGURE 7. Fluid pressure is then applied through the running string and out through the port 64 to drive the sleeve 72 upwardly and thereby free the running string latching dogs 42 for outward movement. A pulling force is then applied to the running string 19 at the barge 12 to remove the entire running string apparatus, including the guide frame 35, from the underwater installation 23 up to the barge 12 (see FIGURE 10.)

We claim as our invention:

1. Apparatus for remotely installing a flowline at an underwater facility comprising:
    (a) an underwater facility anchored on the ocean floor;
    (b) alignment means operatively associated with the facility and adapted to engage a flowline;
    (c) flexible drawline means engageable with said alignment means and having a first end adapted to be secured to a source of tension and a second end adapted to be coaxially secured to a coaxial flowline;
    (d) said second end of the drawline including a housing having a first end provided with flowline engaging means, said engaging means being movable out of engagement with the end of a flowline; and
    (e) said housing having actuating means operably engageable with said engaging means to release said flowline-engaging means from engagement with the end of a flowline.

2. Apparatus according to claim 1 further including means provided at said alignment means for activating said actuating means.

3. Apparatus according to claim 1 wherein the second end of said housing has a drawline receiving socket pivotally secured thereon.

4. Apparatus according to claim 1 wherein said flowline engaging means comprise a plurality of elements disposed in an annular ring so as to be engageable with the inner wall of the flowline.

5. Apparatus according to claim 1 wherein said actuating means further comprises:
    (a) a plurality of button members slidably received in apertures formed in the wall of said housing;
    (b) movable means normally biasing said button members outwardly beyond the radial extent of said housing; and
    (c) means responsive to the radial position of said buttons for normally retaining said flowline engaging means engaged to the said flowline and for releasing said flowline engaging means from the flowline upon radial movement of said buttons.

6. Apparatus according to claim 5 wherein the means set forth in (c) thereof includes a slidable sleeve received in said housing and adapted to normally cooperate with said button members to force said flowline engaging means into engagement with said flowline.

7. Apparatus for remotely installing a flowline at an underwater facility comprising:
    (a) an underwater facility anchored to the ocean flood;
    (b) an alignment tube operatively associated with the facility and adapted to receive a flowline;
    (c) flexible drawline means extending through the tube having a first end adapted to be secured to a source of tension and a second end adapted to be secured to a flowline;
    (d) said second end of the drawline including a housing having a first end provided with a plurality of flowline engaging elements, said elements being movable into and out of engagement with the end of a flowline;
    (e) said housing having a second end provided with actuating means operable to release said flowline engaging elements from engagement with the end of a flowline.

References Cited

UNITED STATES PATENTS

| | | | |
|---|---|---|---|
| 3,233,667 | 2/1966 | Van Winkle | 166—.6 |
| 3,260,270 | 7/1966 | Watkins et al. | 166—.5 X |
| 3,229,950 | 1/1967 | Shatto | 166—.5 |
| 3,308,881 | 3/1967 | Chan et al. | 166—.6 |

CHARLES E. O'CONNELL, *Primary Examiner.*

R. E. FAVREAU, *Assistant Examiner.*